United States Patent
Zhang et al.

(10) Patent No.: US 12,299,314 B2
(45) Date of Patent: May 13, 2025

(54) STORAGE MANAGEMENT SYSTEM AND METHOD

(71) Applicant: EMC IP Holding Company, LLC, Hopkinton, MA (US)

(72) Inventors: Xiaobo Zhang, Beijing (CN); Rongrong Shang, Beijing (CN); Chun Ma, Beijing (CN); Amitai Alkalay, Kadima (IL); Vamsi Vankamamidi, Hopkinson, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 76 days.

(21) Appl. No.: 17/727,149

(22) Filed: Apr. 22, 2022

(65) Prior Publication Data
US 2023/0342071 A1    Oct. 26, 2023

(51) Int. Cl.
*G06F 3/06*     (2006.01)

(52) U.S. Cl.
CPC .......... *G06F 3/0655* (2013.01); *G06F 3/0604* (2013.01); *G06F 3/0664* (2013.01); *G06F 3/0673* (2013.01)

(58) Field of Classification Search
CPC .... G06F 3/0655; G06F 3/0604; G06F 3/0664; G06F 3/0673
See application file for complete search history.

(56) References Cited

U.S. PATENT DOCUMENTS

| | | | |
|---|---|---|---|
| 2001/0047482 A1* | 11/2001 | Harris | G06F 11/0793 714/E11.023 |
| 2007/0171562 A1* | 7/2007 | Maejima | G11B 27/002 |
| 2015/0378858 A1* | 12/2015 | Ishizaka | G06F 11/2094 714/6.22 |
| 2019/0042106 A1* | 2/2019 | Klein | G06F 3/0688 |
| 2019/0129614 A1* | 5/2019 | Dalmatov | G06F 3/0689 |
| 2020/0026647 A1* | 1/2020 | Li | G06F 12/0804 |
| 2021/0232626 A1* | 7/2021 | Santry | G06F 18/2148 |
| 2021/0326225 A1* | 10/2021 | Mueller | G06F 11/1666 |

* cited by examiner

*Primary Examiner* — Nanci N Wong
(74) *Attorney, Agent, or Firm* — Brian J. Colandreo; Heath M. Sargeant; Holland & Knight LLP

(57) ABSTRACT

A method, computer program product, and computing system for determining that one non-volatile random access memory (NVRAM) drive of a pair of NVRAM drives of a storage system is offline, thus defining an offline NVRAM drive and an online NVRAM drive. A virtual disk may be generated on a plurality of solid-state disks (SSDs) of the storage system. The contents of the online NVRAM drive may be copied to the virtual disk. The virtual disk may be exposed to the storage system as a representation of the offline NVRAM drive.

15 Claims, 10 Drawing Sheets

12

12

STORAGE MANAGEMENT SYSTEM AND METHOD

BACKGROUND

Storing and safeguarding electronic content may be beneficial in modern business and elsewhere. Accordingly, various methodologies may be employed to protect and distribute such electronic content.

For example, persistent storage drives, such as non-volatile random access memory (NVRAM) drives, may be utilized to persist data within a storage processor/node before the data is persisted to a storage array. In this manner, the NVRAM drive(s) may prevent data loss if and when the storage processor/node goes offline. Additionally, these NVRAM drives may be organized in pairs for high availability purposes. However, because data persistency on an NVRAM drive is reliant upon a power supply, a single storage node fault or power failure may take e.g., half of the NVRAM drives offline, and the remaining NVRAM drive may lose a redundancy source. Further, because NVRAM has no spare reservation, data on the surviving NVRAM drive may be vulnerable and left to operate in a degraded mode. However, existing approaches may be inadequate to protect the system from data lost in the case that the remaining NVRAM goes offline.

SUMMARY OF DISCLOSURE

In one example implementation, a computer-implemented method executed on a computing device may include, but is not limited to, determining that one non-volatile random access memory (NVRAM) drive of a pair of NVRAM drives of a storage system is offline, thus defining an offline NVRAM drive and an online NVRAM drive. A virtual disk may be generated on a plurality of solid-state disks (SSDs) of the storage system. The contents of the online NVRAM drive may be copied to the virtual disk. The virtual disk may be exposed to the storage system as a representation of the offline NVRAM drive.

One or more of the following example features may be included. The pair of NVRAM drives may be configured to include mirrored data. The storage system may include a pair of storage nodes in an active/active configuration. Generating a virtual disk on a plurality of solid-state disks of the storage system may include mapping a plurality of entries of the online NVRAM drive to a plurality of slices of the plurality of SSDs. Exposing the virtual disk as a representation of the offline NVRAM drive to the storage system may include mirroring incoming input/output (TO) write data to the online NVRAM drive and the virtual disk. One or more SSDs of the plurality of SSDs of the virtual disk may be determined to be offline. A new virtual disk may be generated on the plurality of SSDs. The offline NVRAM drive may be determined to be back online, thus defining a recovered NVRAM drive. The contents of the virtual disk may be copied to the recovered NVRAM drive.

In another example implementation, a computer program product resides on a computer readable medium that has a plurality of instructions stored on it. When executed by a processor, the instructions cause the processor to perform operations that may include, but are not limited to, determining that one non-volatile random access memory (NVRAM) drive of a pair of NVRAM drives of a storage system is offline, thus defining an offline NVRAM drive and an online NVRAM drive. A virtual disk may be generated on a plurality of solid-state disks (SSDs) of the storage system. The contents of the online NVRAM drive may be copied to the virtual disk. The virtual disk may be exposed to the storage system as a representation of the offline NVRAM drive.

One or more of the following example features may be included. The pair of NVRAM drives may be configured to include mirrored data. The storage system may include a pair of storage nodes in an active/active configuration. Generating a virtual disk on a plurality of solid-state disks of the storage system may include mapping a plurality of entries of the online NVRAM drive to a plurality of slices of the plurality of SSDs. Exposing the virtual disk as a representation of the offline NVRAM drive to the storage system may include mirroring incoming input/output (TO) write data to the online NVRAM drive and the virtual disk. One or more SSDs of the plurality of SSDs of the virtual disk may be determined to be offline. A new virtual disk may be generated on the plurality of SSDs. The offline NVRAM drive may be determined to be back online, thus defining a recovered NVRAM drive. The contents of the virtual disk may be copied to the recovered NVRAM drive.

In another example implementation, a computing system includes at least one processor and at least one memory architecture coupled with the at least one processor, wherein the at least one processor configured to determine that one non-volatile random access memory (NVRAM) drive of a pair of NVRAM drives of a storage system is offline, thus defining an offline NVRAM drive and an online NVRAM drive. A virtual disk may be generated on a plurality of solid-state disks (SSDs) of the storage system. The contents of the online NVRAM drive may be copied to the virtual disk. The virtual disk may be exposed to the storage system as a representation of the offline NVRAM drive.

One or more of the following example features may be included. The pair of NVRAM drives may be configured to include mirrored data. The storage system may include a pair of storage nodes in an active/active configuration. Generating a virtual disk on a plurality of solid-state disks of the storage system may include mapping a plurality of entries of the online NVRAM drive to a plurality of slices of the plurality of SSDs. Exposing the virtual disk as a representation of the offline NVRAM drive to the storage system may include mirroring incoming input/output (TO) write data to the online NVRAM drive and the virtual disk. One or more SSDs of the plurality of SSDs of the virtual disk may be determined to be offline. A new virtual disk may be generated on the plurality of SSDs. The offline NVRAM drive may be determined to be back online, thus defining a recovered NVRAM drive. The contents of the virtual disk may be copied to the recovered NVRAM drive.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
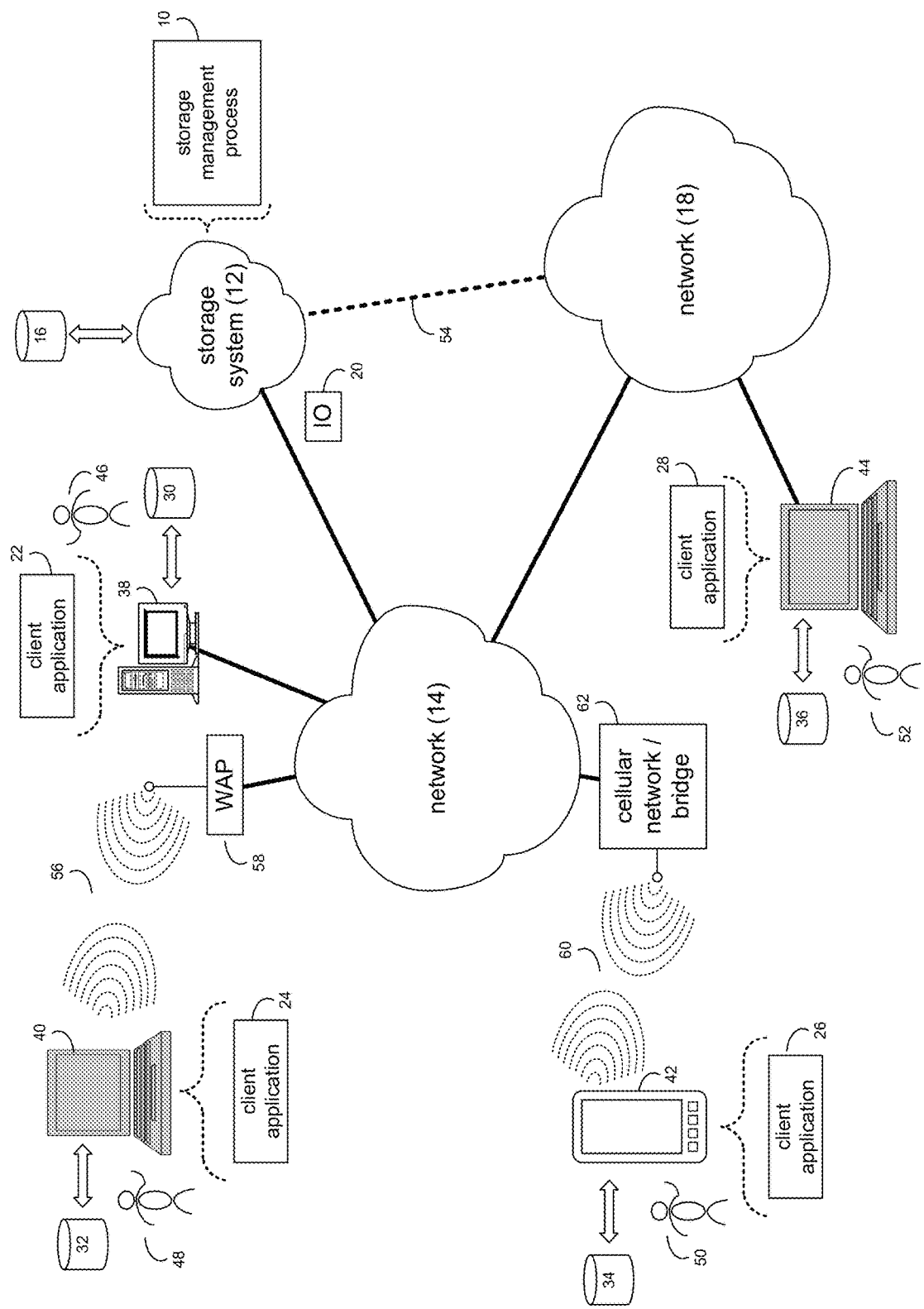
FIG. 1 is an example diagrammatic view of a storage system and a storage management process coupled to a distributed computing network according to one or more example implementations of the disclosure.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of storage management process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a storage management process, such as storage management process 10 of FIG. 1, may include but is not limited to, determining that one non-volatile random access memory (NVRAM) drive of a pair of NVRAM drives of a storage system is offline, thus defining an offline NVRAM drive and an online NVRAM drive. A virtual disk may be generated on a plurality of solid-state disks (SSDs) of the storage system. The contents of the online NVRAM drive may be copied to the virtual disk. The virtual disk may be exposed to the storage system as a representation of the offline NVRAM drive.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
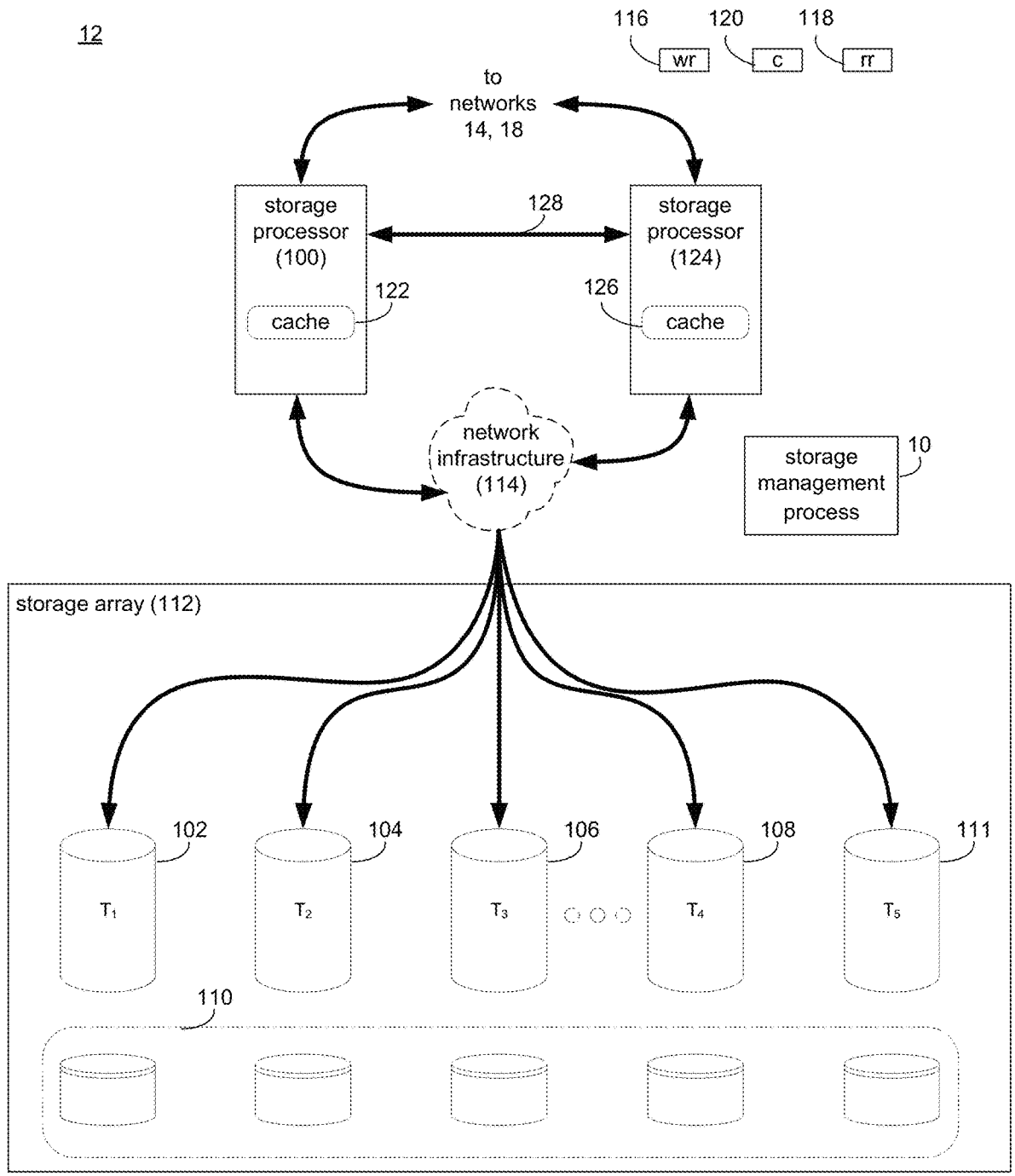
FIG. 2 is an example diagrammatic view of the storage system of FIG. 1 according to one or more example implementations of the disclosure.
Figure 3:
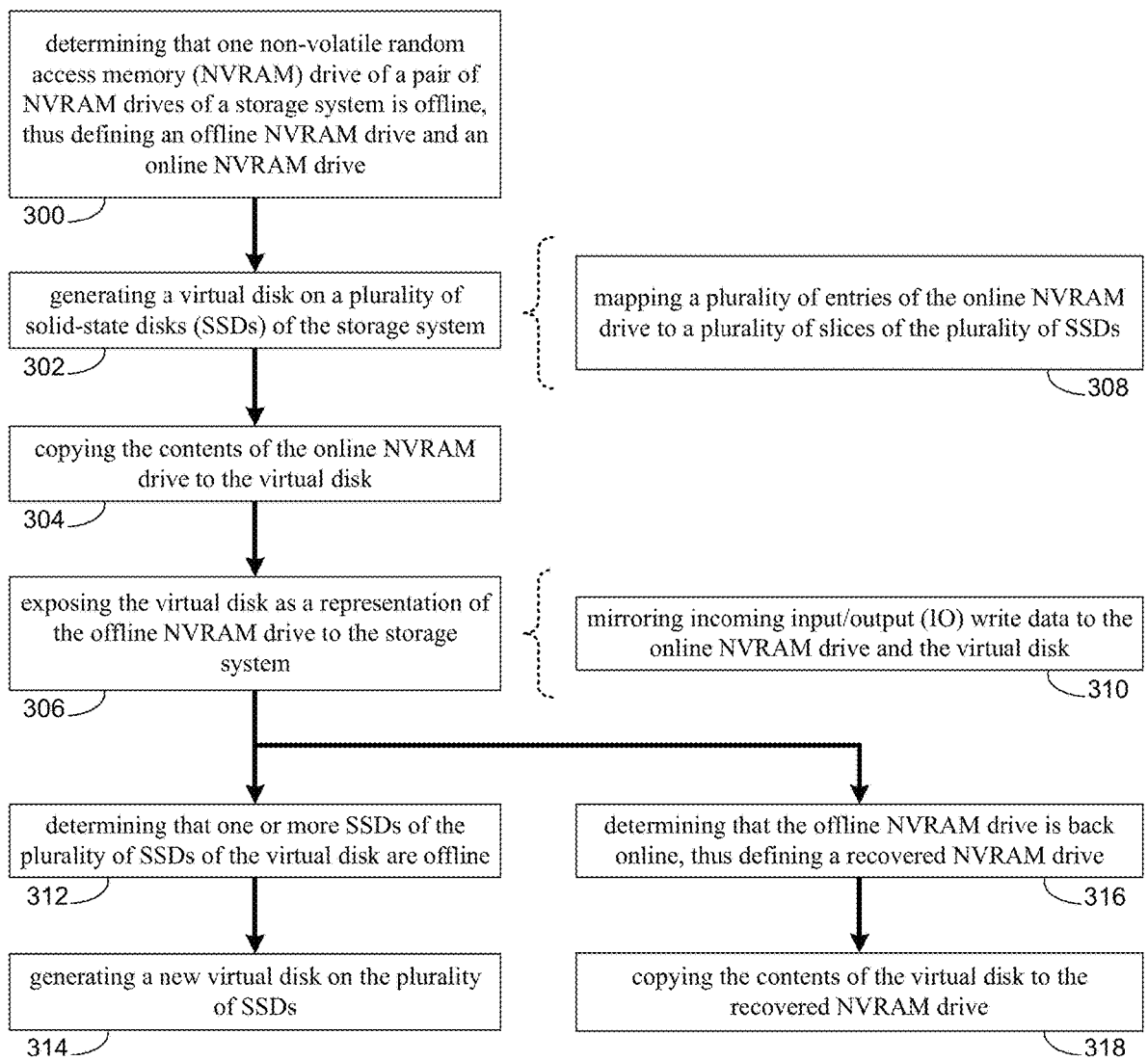
FIG. 3 is an example flowchart of storage management process according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage devices (e.g., storage devices 110) used to create the storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage devices used to create the storage targets. By mirroring data between storage devices, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 111. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 111), this is for example purposes only and is not intended to be a limitation of this disclosure. Specifically, the actual number of coded targets may be increased or decreased depending upon e.g. the level of redundancy/performance/capacity required.

Storage targets 102, 104, 106, 108 and coded target 111 may be created as volumes using one or more electro-mechanical hard disk drives and/or solid-state/flash devices (e.g., storage devices 110), wherein a combination of storage targets 102, 104, 106, 108 and coded target 111 and processing/control systems (not shown) may form storage array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 111 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 111 may be a RAID device and/or computer-based hard disk drives. Further still, one or more of storage targets 102, 104, 106, 108 and/or coded target 111 may be a SAN.

In the event that storage system 12 is configured as a SAN, the various components of storage system 12 (e.g. storage processor 100, storage targets 102, 104, 106, 108, and coded target 111) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of storage management process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to storage array 112 (if frontend cache memory system 122 is configured as a write-through cache) or may subsequently write content 118 to storage array 112 (if frontend cache memory system 122 is configured as a write-back cache).

As discussed above, the instruction sets and subroutines of storage management process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of storage management process 10 may be executed by one or more processors (not shown) and one or more memory architectures (not shown) included within storage array 112.

Further and as discussed above, during the operation of storage array 112, content (e.g., content 118) to be written to storage array 112 may be received from storage processor 100 and initially stored within backend cache memory system 124 prior to being stored on e.g. one or more of storage targets 102, 104, 106, 108, 111. Accordingly, during use of storage array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 124), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 124 may function like storage processor 100. For example, during operation of storage processor 124, content 118 to be written to storage system 12 may be processed by storage processor 124. Additionally/alternatively and when storage processor 124 is configured as an application server, content 118 to be written to storage system 12 may be internally generated by storage processor 124.

Storage processor 124 may include frontend cache memory system 126. Examples of frontend cache memory system 126 may include but are not limited to a volatile, solid-state, cache memory system (e.g., a dynamic RAM cache memory system) and/or a non-volatile, solid-state, cache memory system (e.g., a flash-based, cache memory system).

Storage processor 124 may initially store content 118 within frontend cache memory system 124. Depending upon the manner in which frontend cache memory system 126 is configured, storage processor 124 may immediately write content 118 to storage array 112 (if frontend cache memory system 126 is configured as a write-through cache) or may subsequently write content 118 to storage array 112 (if frontend cache memory system 126 is configured as a write-back cache).

In some implementations, the instruction sets and subroutines of node fencing process 10, which may be stored on storage device 16 included within storage system 12, may be executed by one or more processors (not shown) and one or more memory architectures (not shown) included within storage system 12. Accordingly, in addition to being executed on storage processor 124, some or all of the instruction sets and subroutines of node fencing 10 may be executed by one or more processors (not shown) and one or more memory architectures (not shown) included within storage array 112.

Further and as discussed above, during the operation of storage array 112, content (e.g., content 118) to be written to storage array 112 may be received from storage processor 124 and initially stored within backend cache memory system 124 prior to being stored on e.g. one or more of storage targets 102, 104, 106, 108, 111. Accordingly, during use of storage array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 111 (which would typically be slower).

As discussed above, storage processor 100 and storage processor 124 may be configured in an active/active configuration where processing of data by one storage processor may be synchronized to the other storage processor. For example, data may be synchronized between each storage processor via a separate link or connection (e.g., connection 128).

The Storage Management Process:

Referring also to the examples of FIGS. 3-10 and in some implementations, storage management process 10 may determine 300 that one non-volatile random access memory (NVRAM) drive of a pair of NVRAM drives of a storage system is offline, thus defining an offline NVRAM drive and an online NVRAM drive. A virtual disk may be generated 302 on a plurality of solid-state disks (SSDs) of the storage system. The contents of the online NVRAM drive may be copied 304 to the virtual disk. The virtual disk may be exposed 306 to the storage system as a representation of the offline NVRAM drive.

As will be discussed in greater detail below, storage management process 10 may achieve NVRAM drive resiliency which can effectively protect a storage system from data lost in the case of multi-node power failure. For example and as discussed above, persistent storage drives, such as non-volatile random access memory (NVRAM) drives, may be utilized to persist data within a storage processor/node before the data is persisted to a storage array. In this manner, the NVRAM drive(s) may prevent data loss if and when the storage processor/node goes offline. Additionally, these NVRAM drives may be organized in pairs for high availability purposes. However, because data persistency on an NVRAM drive is reliant upon a power supply, a single storage node fault or power failure may take e.g., half of the NVRAM drives offline, and the remaining NVRAM drive may lose a redundancy source. Further, because NVRAM has no spare reservation, data on the surviving NVRAM drive may be vulnerable and left to operate in a degraded mode. However, existing approaches may be inadequate to protect the system from data lost in the case that the remaining NVRAM drive goes offline.

Figure 4:
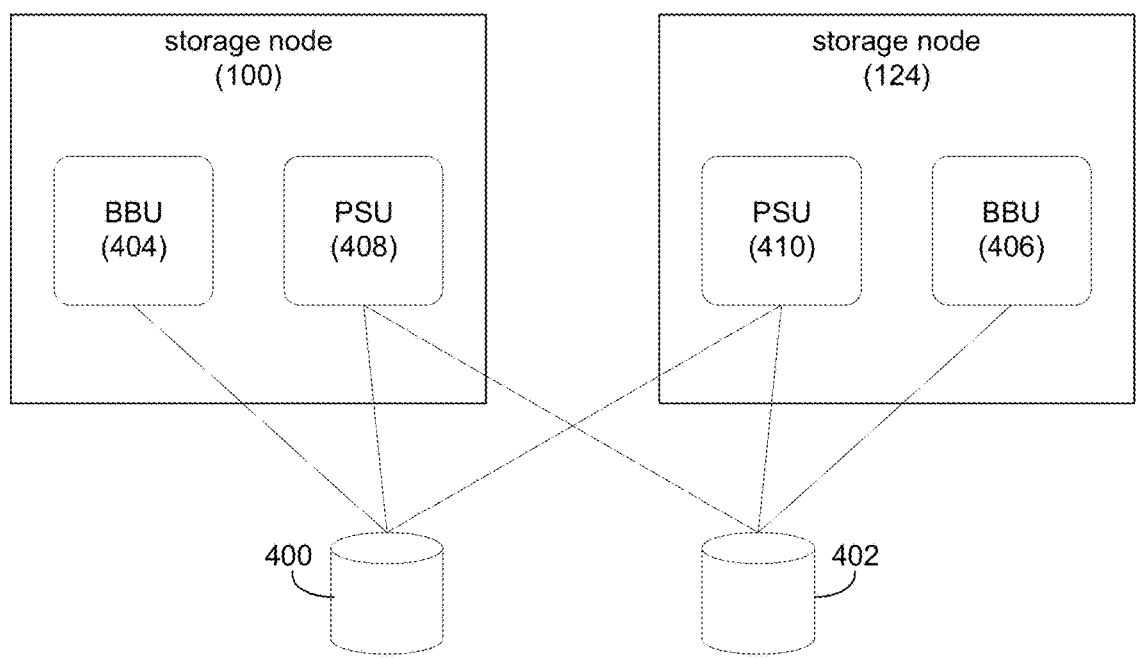
FIGS. 4-10 are example diagrammatic views of the storage system of FIG. 1 according to one or more example implementations of the disclosure.

In some implementations, storage management process 10 may determine 300 that one non-volatile random access memory (NVRAM) drive of a pair of NVRAM drives of a storage system is offline, thus defining an offline NVRAM drive and an online NVRAM drive. Referring also to FIG. 4 and in some implementations, a storage system (e.g., storage system 12) may include a pair of storage nodes (e.g., storage nodes 100, 124) in an active/active configuration (i.e., where processing of data by one storage node may be synchronized to the other storage node). Each storage node (e.g., storage nodes 100, 124) may have access to at least one NVRAM drive of a pair of NVRAM drives (e.g., NVRAM drives 400, 402). In some implementations, the pair of NVRAM drives (e.g., NVRAM drives 400, 402) may be configured to include mirrored data. Such that duplicate copies of the data stored in one NVRAM drive is mirrored to the other NVRAM drive.

In some implementations, the NVRAM drives may be configured to persistently store data from one or more IO requests processed by each storage node. For example, as storage processor 100 processes an IO write request on storage system 100, storage management process 10 may persist the data (or a reference to the data) of the IO write request in the NVRAM drive (e.g., NVRAM drive 400). The pair of NVRAM drives may be positioned within each respective storage node (i.e., NVRAM drive 400 positioned within storage node 100 and NVRAM drive 402 positioned within storage node 124). As shown in FIG. 4, each storage node (e.g., storage nodes 100, 124) may include a battery backup unit (BBU 404 of storage node 100 and BBU 406 of storage node 124) configured to provide battery power to each NVRAM drive (e.g., BBU 404 to provide battery backup power for NVRAM drive 400 and BBU 406 to provide battery backup power for NVRAM drive 402). In this manner, NVRAM drives 400 and 402 may persist data during a power failure.

Additionally, each storage node may include a power supply unit (PSU 408 of storage node 100 and PSU 410 of storage node 124). These power supply units may provide primary power to each NVRAM drive during normal operation of the storage system. In some implementations and as shown in FIG. 4, each power supply unit may be coupled to each NVRAM drive (e.g., PSU 408 of storage node 100 is coupled to NVRAM drives 400, 402 and PSU 410 of storage node 124 is coupled to NVRAM drives 400, 402). In this manner, power may be supplied to each NVRAM drive during normal operation of the storage system.

While the above discussion includes a single pair of NVRAM drives, it will be appreciated that this is for example purposes only. For example, suppose that each storage node (e.g., storage nodes 100, 124) had access to e.g., two NVRAM drives that formed a pair with another NVRAM drive on the other storage node. In this example, each node may have access to half of the pair of NVRAM drives. As will be discussed in greater detail below, any discussion pertaining to one pair of NVRAM drives equally applies to any number of NVRAM drives.

Figure 5:
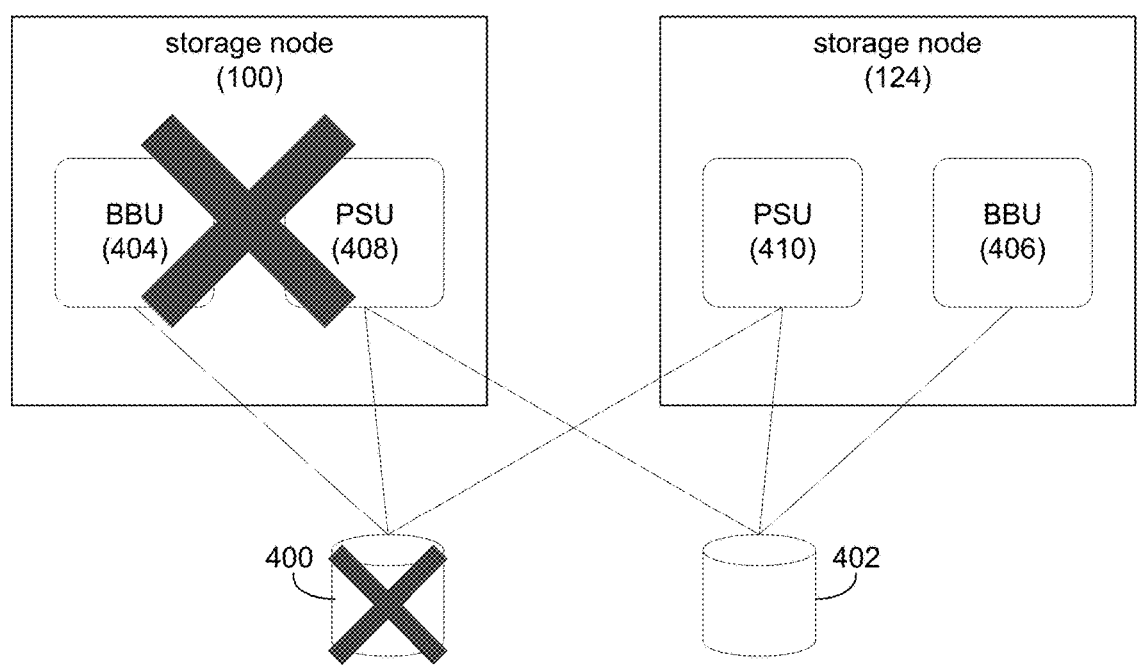

Referring also to FIG. 5, suppose that NVRAM drive 400 goes offline (e.g., due to a power failure within storage node 100, storage node 100 going offline, and/or failure of storage node 100 generally). In this example, because NVRAM drive 400 is powered by BBU 404 and PSU 408 from storage node 100, NVRAM 400 may go offline (e.g., after the supply of power by BBU 404 ceases) when storage node 100 goes offline. Accordingly, storage node 124 may be unable to access the contents of NVRAM drive 400. However, because the contents of NVRAM drives 400, 402 are mirrored, the data may be preserved in NVRAM drive 402. Storage management process 10 may determine 300 that NVRAM 400 is offline, thus defining offline NVRAM drive 400 and online NVRAM drive 402. In this manner and as will be described in greater detail below, storage management process 10 may utilize NVRAM drive 402 to preserve the contents of NVRAM drive 402 from the possibility of further power disruptions.

Figure 6:
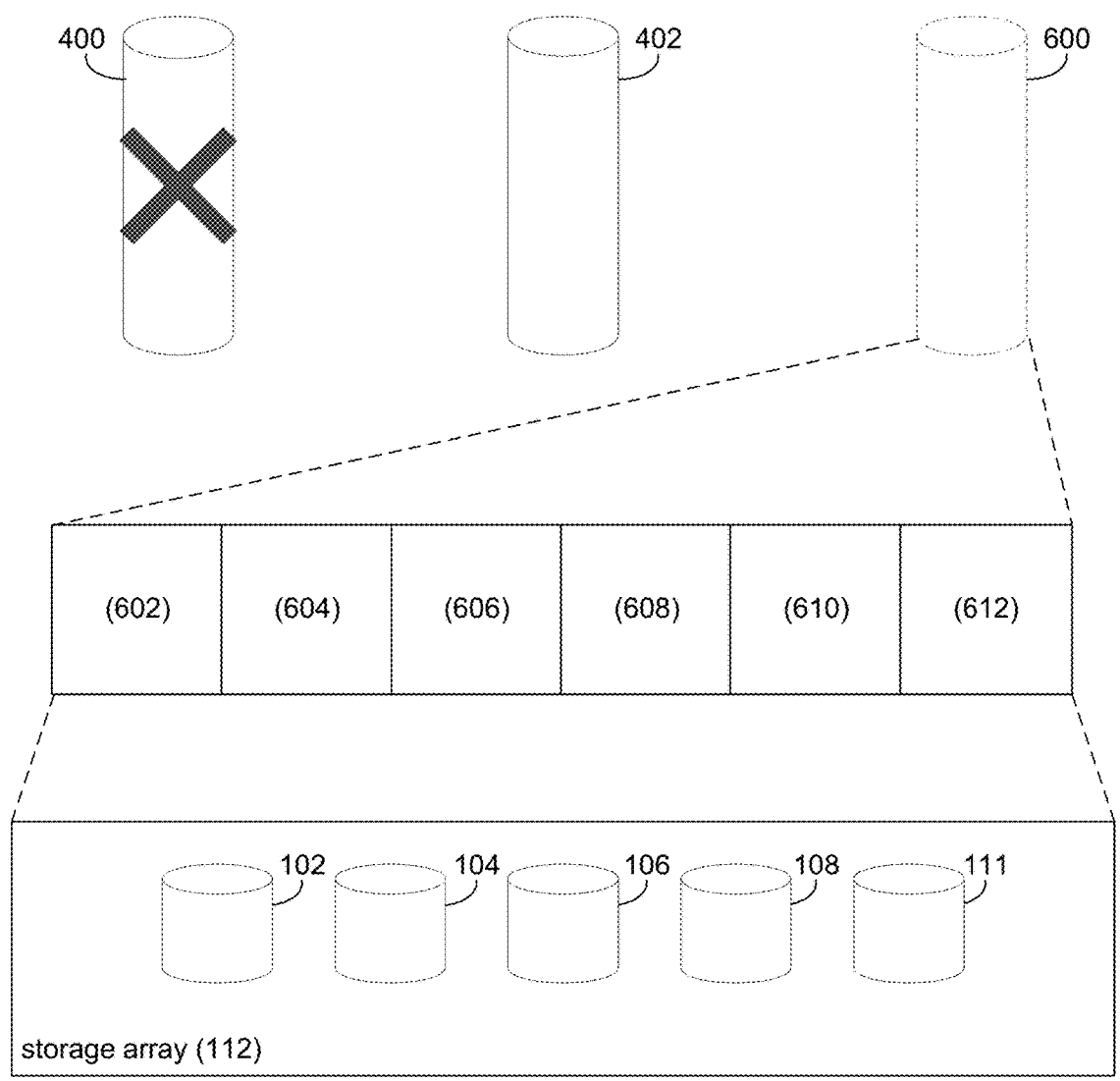

In some implementations, storage management process 10 may generate 302 a virtual disk on a plurality of solid-state disks (SSDs) of the storage system. Referring also to FIG. 6, storage array 112 may include a plurality of solid-state disks (SSDs) (e.g., SSDs 102, 104, 106, 108, 111). Each SSD may include a plurality of slices (e.g., 4 gigabyte (GB) slices). In response to determining 300 that NVRAM drive 400 is offline, storage management process 10 may generate 302 a virtual disk (e.g., virtual disk 600) on SSDs 102, 104, 106, 108, 111. To generate 302 virtual disk 600, storage management process 10 may select a plurality of slices from the plurality of SSDs (e.g., SSDs 102, 104, 106, 108, 111) to form the virtual disk. The selection of particular slices (e.g., slices 602, 604, 606, 608, 610, 612) may be random, may be based on load-balancing among the plurality of SSDs, may be based on the wear-level of each SSD, etc. For example, storage management process 10 may select slices across different SSDs to achieve maximum bandwidth. In this manner, it will be appreciated that the plurality of slices used to form virtual disk 600 may be selected in various ways within the scope of the present disclosure.

Generating 302 a virtual disk on a plurality of solid-state disks of the storage system may include mapping 308 a plurality of entries of the online NVRAM drive to a plurality of slices of the plurality of SSDs. For example, storage management process 10 may map 308 a plurality of entries of the online NVRAM drive (e.g., online NVRAM drive 402) to a plurality of slices (e.g., slices 602, 604, 606, 608, 610, 612) of SSDs 102, 104, 106, 108, 111 that are selected to form virtual disk 600. In some implementations, mapping 308 the plurality of entries of online NVRAM drive 402 may map the granularity of the entries of online NVRAM drive 402 to the granularity of the plurality of slices of SSDs 102, 104, 106, 108, 111. For example, suppose that the granularity of the plurality of entries of online NVRAM 402 is e.g., 32 kilobytes (KB) while the granularity of the plurality of slices of the plurality of SSDs is e.g., 4 GB. In this example, storage management process 10 may map each e.g., 32 KB entry of online NVRAM 402 to a e.g., 4 GB slice of SSDs 102, 104, 106, 108, 111. While example granularities of the NVRAM drive and the SSDs have been discussed, it will be appreciated that these are for example purposes only and that storage management process 10 may map the entries of the NVRAM drive to the slices of the SSDs regardless of the respective granularities for each device or device type within the scope of the present disclosure.

Figure 7:
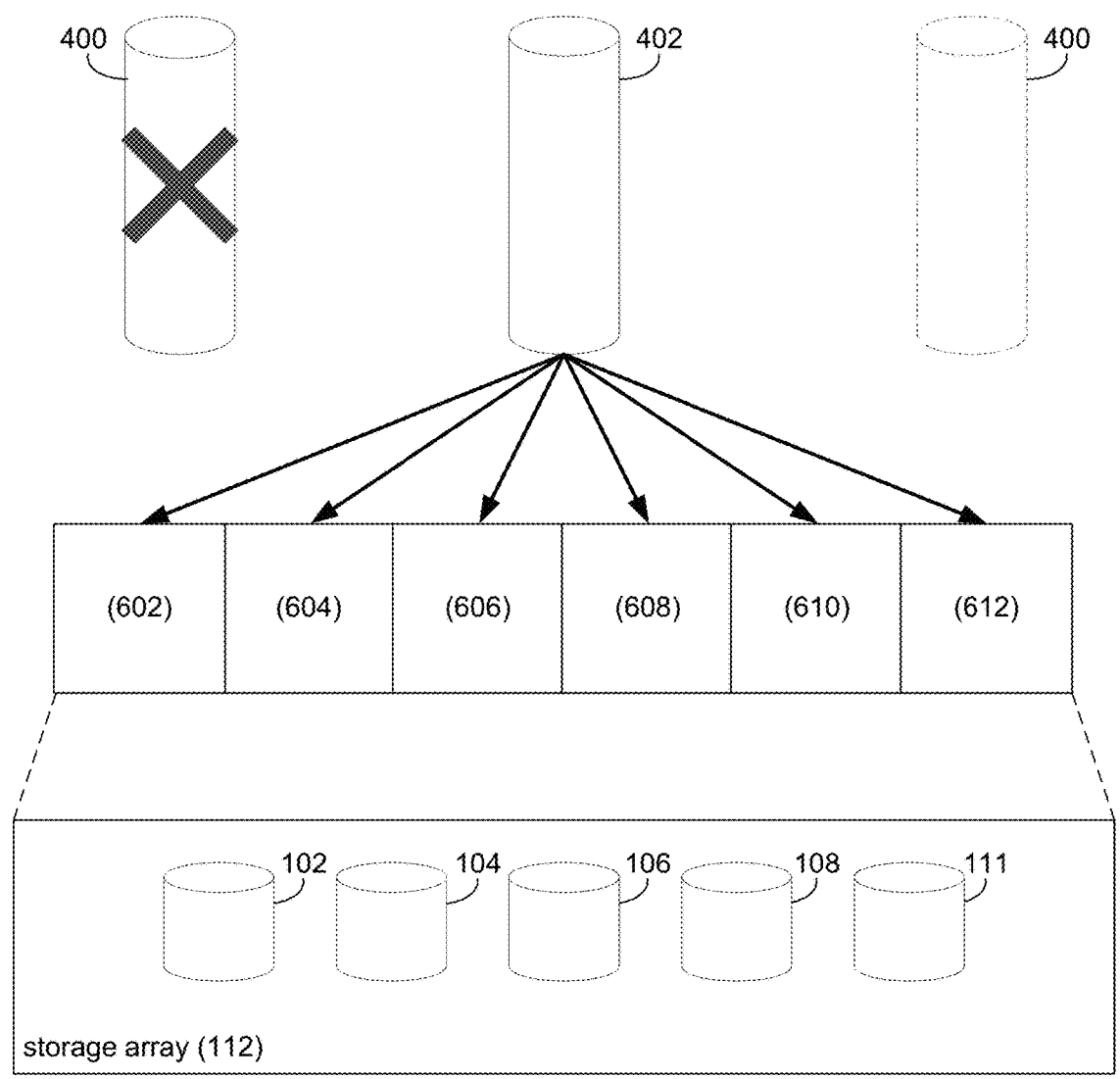
Figure 8:
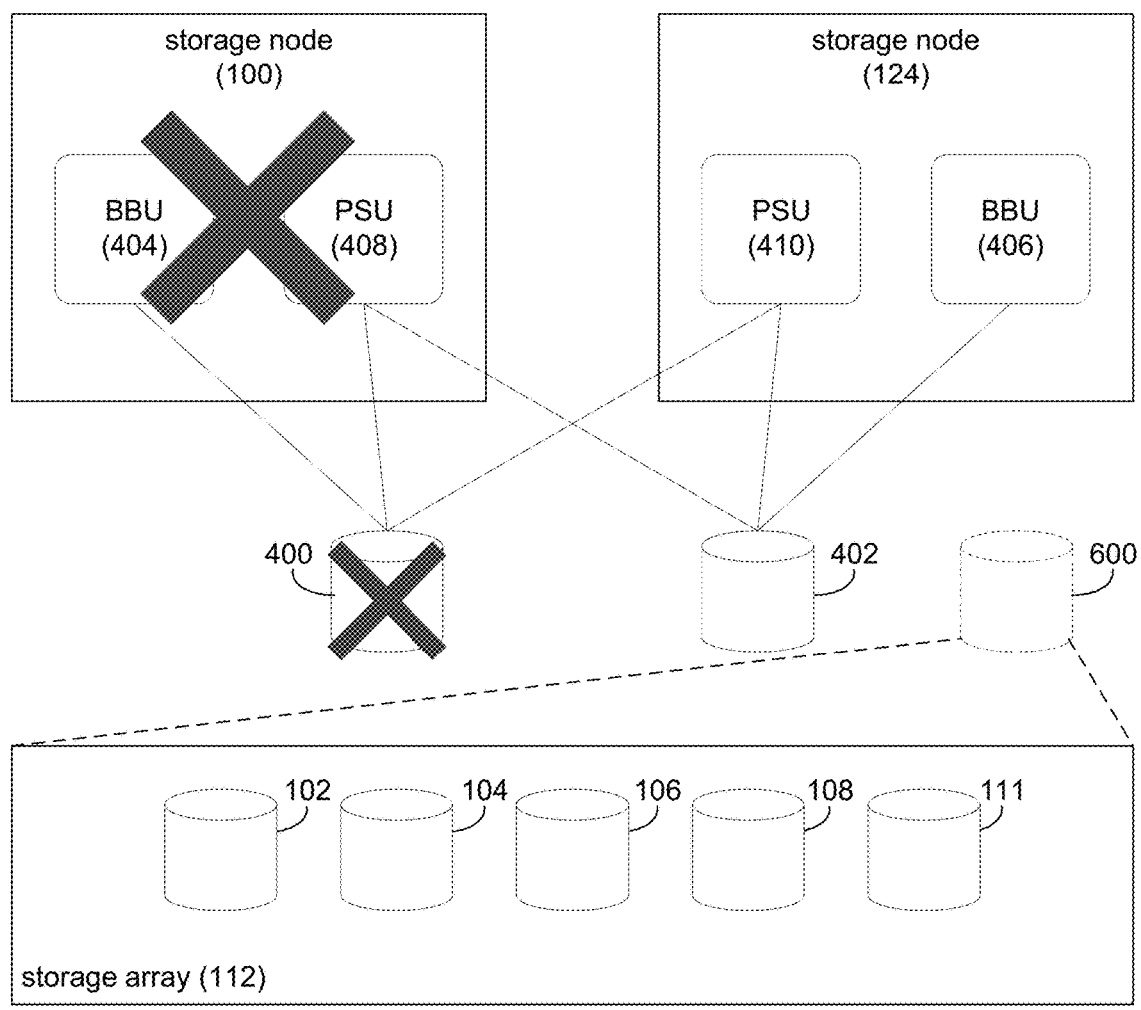

In some implementations, storage management process 10 may copy 304 the contents of the online NVRAM drive to the virtual disk. Referring also to FIG. 7, storage management process 10 may copy the plurality of entries of online NVRAM drive 402 to the plurality of slices (e.g., slices 602, 604, 606, 608, 610, 612). While FIG. 7 shows e.g., six slices corresponding to six entries of online NVRAM drive 402, it will be appreciated that this is for example purposes only and that any number of entries may be copied 304 from the online NVRAM to the virtual disk within the scope of the present disclosure.

In some implementations, storage management process 10 may expose 306 the virtual disk as a representation of the offline NVRAM drive to the storage system. Exposing 306 the virtual disk as a representation of the offline NVRAM drive to the storage system may generally include utilizing storage system logic to represent virtual disk 600 as an NVRAM drive with the same characteristics as offline NVRAM 400. Referring also to FIG. 7, storage management process 10 may expose 306 virtual disk 600 as a representation of offline NVRAM drive 400.

Exposing 306 the virtual disk as a representation of the offline NVRAM drive to the storage system may include mirroring 310 incoming input/output (IO) write data to the online NVRAM drive and the virtual disk. For example, storage management process 10 may process incoming IO write requests on the pair of NVRAM drives. Referring again to FIG. 7, storage management process 10 may process incoming IO requests using storage node 124 (as storage node 100 is offline) and may mirror 310 the data to online NVRAM drive 402 and virtual disk 600 representative of offline NVRAM drive 400. In some implementations, storage management process 10 may perform any IO read operations by reading from online NVRAM drive 402 as the performance characteristics of NVRAM drive 402 are superior to those of virtual disk 600. In this manner, storage management process 10 may preserve data within the pair of NVRAM drives in a virtual disk representation of the offline NVRAM drive while providing high performance processing using the online NVRAM drive.

Figure 9:
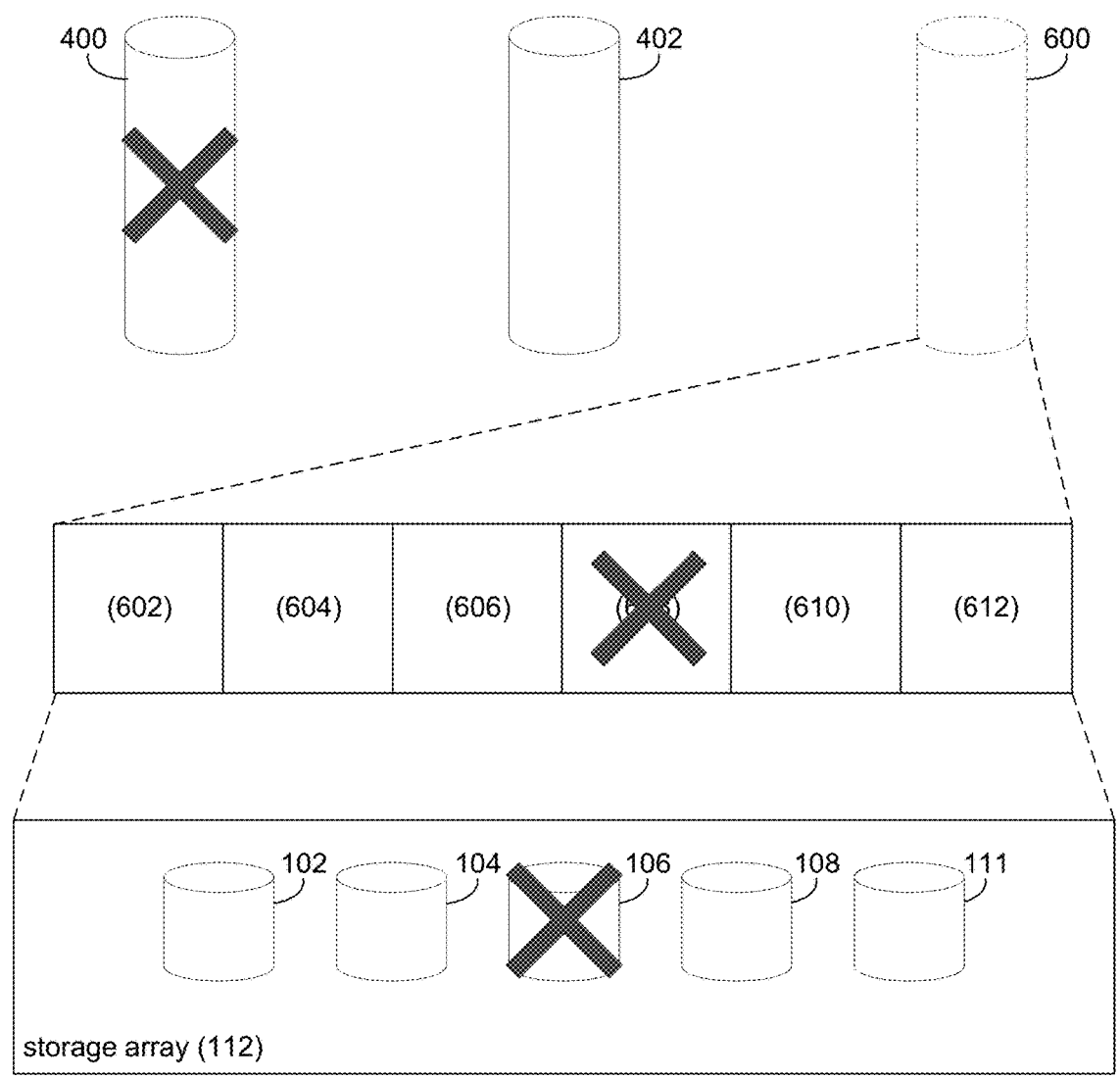

In some implementations, storage management process 10 may determine 312 that one or more SSDs of the plurality of SSDs of the virtual disk are offline. Referring also to FIG. 9, suppose that SSD 106 goes offline (e.g., is taken offline or fails) while providing a slice (e.g., slice 608) to virtual disk 600 representative of offline NVRAM 400. In this example, storage management process 10 may determine 312 that SSD 106 is offline (e.g., via a notification from storage node 124, a notification from storage array 112, in response to failed access to SSD 106, etc.). In response to determining that one or more SSDs of the virtual disk are offline, storage management process 10 may generate 314 a new virtual disk on the plurality of SSDs. For example, storage management process 10 may generate 314 a new virtual disk in the manner discussed above and may then destroy the failed virtual disk and release the previously mapped SSD slices.

Figure 10:
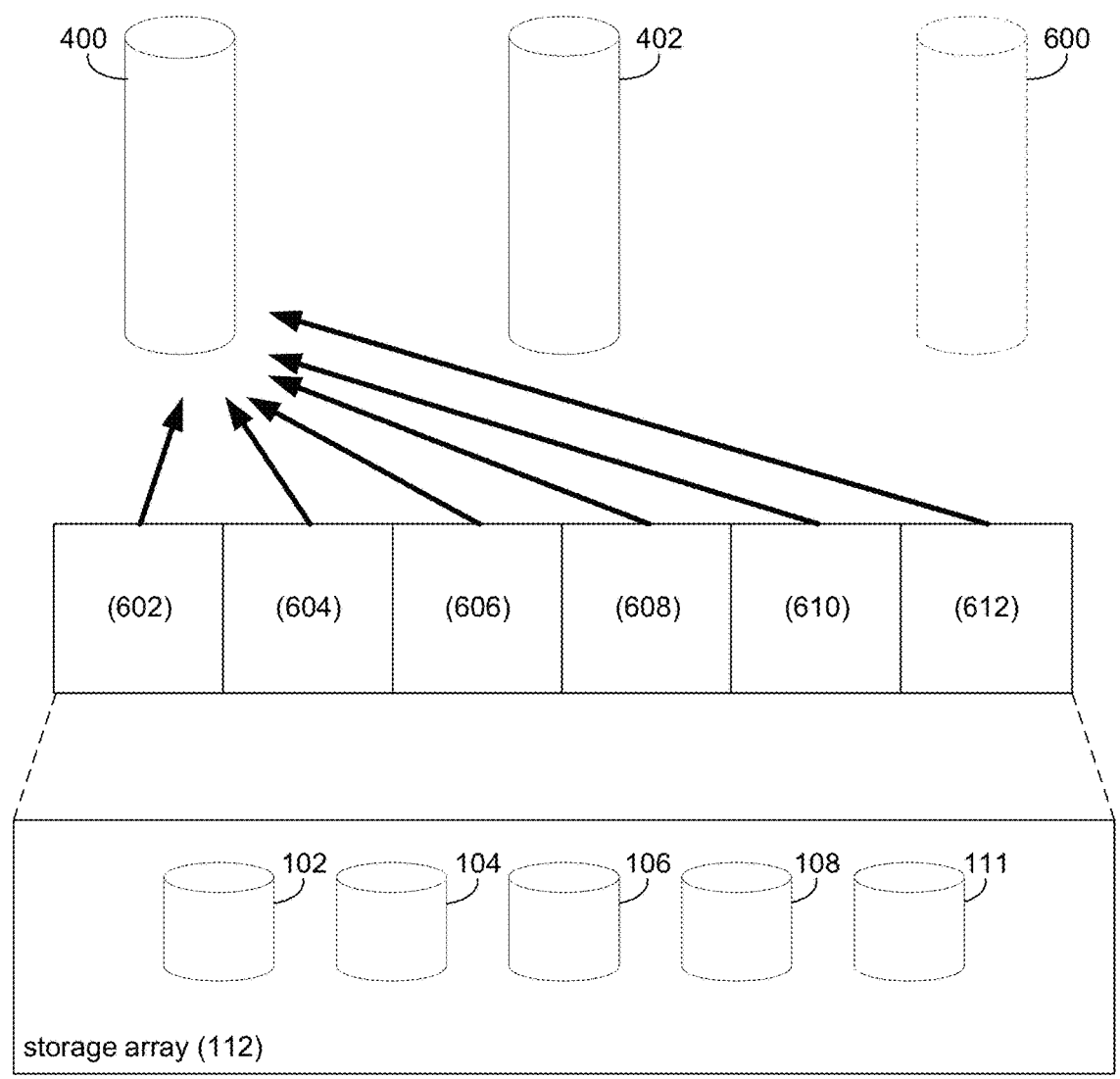

In some implementations, storage management process 10 may determine 316 that the offline NVRAM drive is back online, thus defining a recovered NVRAM drive. Suppose that storage node 100 recovers. In this example, recovery of storage node 100 may recover offline NVRAM drive 400. In response to recovering offline NVRAM drive 400, storage management process 10 may receive a notification and/or may detect the recovery of NVRAM drive 400. In response to NVRAM drive 400 being online, storage management process 10 may copy 318 the contents of the virtual disk to the recovered NVRAM drive. Referring also to FIG. 10, storage management process 10 may copy 318 the contents of virtual disk 600 to NVRAM drive 400. For example, storage management process 10 may copy 318 the plurality of slices (e.g., slices 602, 604, 606, 608, 610) to a plurality of entries of NVRAM drive 400. Once each slice of virtual disk 600 is copied, storage management process 10 may destroy virtual disk 600 and release slices 602, 604, 606, 608, 610 back to storage array 112. Storage management process 10 may expose NVRAM drive 400 to storage system 12 and one or more IO write requests may be processed on each NVRAM drive (e.g., NVRAM drives 400, 402).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   determining that one non-volatile random access memory (NVRAM) drive of a pair of NVRAM drives of a storage system is offline, thus defining an offline NVRAM drive and an online NVRAM drive;
   generating a virtual disk on a plurality of solid-state disks (SSDs) of a storage array, wherein each SSD of the plurality of SSDs includes a plurality of slices and wherein generating the virtual disk on the plurality of SSDs includes:
      selecting the plurality of slices from the plurality of SSDs to form the virtual disk based on load-balancing among the plurality of SSDs, and
      mapping a plurality of entries of the online NVRAM drive to the plurality of slices of the plurality of SSDs;
   copying the contents of the online NVRAM drive to the virtual disk;
   exposing the virtual disk as a representation of the offline NVRAM drive to the storage system;
   determining that the offline NVRAM drive is back online, thus defining a recovered NVRAM drive;
   in response to recovering the offline NVRAM drive, receiving a notification and/or detecting the recovered NVRAM drive; and
   in response to the recovered NVRAM drive being online, copying the contents of the virtual disk to the recovered NVRAM drive,
   wherein once each slice of the plurality of slices of the virtual disk is copied, the virtual disk is destroyed and the plurality of slices is released back to the storage array.

2. The computer-implemented method of claim 1, wherein the pair of NVRAM drives are configured to include mirrored data.

3. The computer-implemented method of claim 1, wherein the storage system includes a pair of storage nodes in an active/active configuration.

4. The computer-implemented method of claim 1, wherein exposing the virtual disk as a representation of the offline NVRAM drive to the storage system includes:
   mirroring incoming input/output (IO) write data to the online NVRAM drive and the virtual disk.

5. The computer-implemented method of claim 1, further comprising:
   determining that one or more SSDs of the plurality of SSDs of the virtual disk are offline; and
   generating a new virtual disk on the plurality of SSDs.

6. A computer program product residing on a non-transitory computer readable medium having a plurality of instructions stored thereon which, when executed by a processor, cause the processor to perform operations comprising:
   determining that one non-volatile random access memory (NVRAM) drive of a pair of NVRAM drives of a storage system is offline, thus defining an offline NVRAM drive and an online NVRAM drive;
   generating a virtual disk on a plurality of solid-state disks (SSDs) of a storage array, wherein each SSD of the plurality of SSDs includes a plurality of slices and wherein generating the virtual disk on the plurality of SSDs includes;
      selecting the plurality of slices from the plurality of SSDs to form the virtual disk based on load-balancing among the plurality of SSDs, and mapping a plurality of entries of the online NVRAM drive to the plurality of slices of the plurality of SSDs;

copying the contents of the online NVRAM drive to the virtual disk;

exposing the virtual disk as a representation of the offline NVRAM drive to the storage system;

determining that the offline NVRAM drive is back online, thus defining a recovered NVRAM drive;

in response to recovering the offline NVRAM drive, receiving a notification and/or detecting the recovered NVRAM drive; and in response to the recovered NVRAM drive being online, copying the contents of the virtual disk to the recovered NVRAM drive, wherein once each slice of the plurality of slices of the virtual disk is copied, the virtual disk is destroyed and the plurality of slices is released back to the storage array.

7. The computer program product of claim 6, wherein the pair of NVRAM drives are configured to include mirrored data.

8. The computer program product of claim 6, wherein the storage system includes a pair of storage nodes in an active/active configuration.

9. The computer program product of claim 6, wherein exposing the virtual disk as a representation of the offline NVRAM drive to the storage system includes:
mirroring incoming input/output (IO) write data to the online NVRAM drive and the virtual disk.

10. The computer program product of claim 6, wherein the operations further comprise:
determining that one or more SSDs of the plurality of SSDs of the virtual disk are offline; and
generating a new virtual disk on the plurality of SSDs.

11. A computing system comprising:
a memory; and
a processor configured to determine that one non-volatile random access memory (NVRAM) drive of a pair of NVRAM drives of a storage system is offline, thus defining an offline NVRAM drive and an online NVRAM drive, wherein the processor is further configured to generate a virtual disk on a plurality of solid-state disks (SSDs) of a storage array, wherein each SSD of the plurality of SSDs includes a plurality of slices, wherein generating the virtual disk on the plurality of SSDs includes: selecting the plurality of slices from the plurality of SSDs to form the virtual disk based on load-balancing among the plurality of SSDs, and mapping a plurality of entries of the online NVRAM drive to the plurality of slices of the plurality of SSDs, wherein the processor is further configured to copy the contents of the online NVRAM drive to the virtual disk, wherein the processor is further configured to expose the virtual disk as a representation of the offline NVRAM drive to the storage system, wherein the processor is further configured to determine that the offline NVRAM drive is back online, thus defining a recovered NVRAM drive, wherein in response to recovering the offline NVRAM drive, the processor is further configured to receive a notification and/or detecting the recovered NVRAM drive, wherein in response to the recovered NVRAM drive being online, the processor is further configured to copy the contents of the virtual disk to the recovered NVRAM drive, and wherein once each slice of the plurality of slices of the virtual disk is copied, the virtual disk is destroyed and the plurality of slices is released back to the storage array.

12. The computing system of claim 11, wherein the pair of NVRAM drives are configured to include mirrored data.

13. The computing system of claim 11, wherein the storage system includes a pair of storage nodes in an active/active configuration.

14. The computing system of claim 11, wherein exposing the virtual disk as a representation of the offline NVRAM drive to the storage system includes:
mirroring incoming input/output (IO) write data to the online NVRAM drive and the virtual disk.

15. The computing system of claim 11, wherein the processor is further configured to:
determine that one or more SSDs of the plurality of SSDs of the virtual disk are offline; and
generate a new virtual disk on the plurality of SSDs.

* * * * *